(12) United States Patent
Chang et al.

(10) Patent No.: US 11,029,786 B2
(45) Date of Patent: Jun. 8, 2021

(54) TOUCH SENSITIVE METHOD, APPARATUS AND ELECTRONIC SYSTEM FOR REDUCING INTERFERENCE FROM PIXEL REFRESHING

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 660 days.

(21) Appl. No.: 15/437,640

(22) Filed: Feb. 21, 2017

(65) Prior Publication Data

US 2017/0242507 A1    Aug. 24, 2017

Related U.S. Application Data

(60) Provisional application No. 62/297,395, filed on Feb. 19, 2016.

(30) Foreign Application Priority Data

Dec. 30, 2016   (TW) ............................. 105144054

(51) Int. Cl.
  *G06F 3/044*   (2006.01)
  *G06F 3/041*   (2006.01)

(52) U.S. Cl.
  CPC .......... *G06F 3/044* (2013.01); *G06F 3/0418* (2013.01); *G06F 2203/04112* (2013.01)

(58) Field of Classification Search
  CPC ................. G06F 3/044; G06F 3/0418; G06F 2203/04112
  See application file for complete search history.

(56) References Cited

U.S. PATENT DOCUMENTS

| 5,606,346 A | * | 2/1997 | Kai | ....................... G06F 1/1626 345/173 |
| 2011/0084926 A1 | * | 4/2011 | Chang | ................ G01R 27/2605 345/173 |

(Continued)

FOREIGN PATENT DOCUMENTS

| CN | 103164059 A | 6/2013 |
| CN | 104699288 B | 1/2018 |

OTHER PUBLICATIONS

Machine Translation of CN 103164059. (Year: 2013).*

*Primary Examiner* — Patrick N Edouard
*Assistant Examiner* — Joseph P Fox
(74) *Attorney, Agent, or Firm* — WPAT, PC

(57) ABSTRACT

A touch sensitive method for reducing interference from pixel refreshing: comprising: performing three detections, each separated by a time interval, via multiple sensing electrodes of a touch screen to generate multiple first detection values, second detection values and third detection values, respectively; adding detection values with respect to the multiple sensing electrodes up as multiple sums of detection values; determining that an external conductive object is approximating or touching the touch screen nearby a N-th sensing electrode according to the multiple sums; and determining a position of the object locates according to one of the first detection values, the second detection values and the third detection values.

23 Claims, 9 Drawing Sheets

(56) References Cited

U.S. PATENT DOCUMENTS

2015/0130750 A1* 5/2015 Morrison .............. G06F 3/0443
                                                    345/174
2016/0103521 A1* 4/2016 Peng ................... G06F 3/04847
                                                    345/174

* cited by examiner

TOUCH SENSITIVE METHOD, APPARATUS AND ELECTRONIC SYSTEM FOR REDUCING INTERFERENCE FROM PIXEL REFRESHING

CROSS REFERENCE TO RELATED APPLICATIONS

This application claims priority under 35 U.S.C. 119 to U.S. provisional patent application, 62/297,395, filed on Feb. 19, 2016, and to Taiwan patent application, 105144054. Filed on Dec. 30, 2016 the disclosures of which are incorporated herein by reference.

BACKGROUND OF THE INVENTION

1. Field of the Invention

The present invention relates to touch screen, and more particularly, to reducing to electromagnetic interference to touch sensitive processing while refreshing pixels.

2. Description of the Prior Art

Touch screens are one of the main input/output devices of modern consumer electronic apparatuses. A typical touch sensitive screen is made in a touch panel whose circuitry is disposed above the screen. There are also touch screens in forms such as in-cell form and on-cell form, both of which are applicable within the scope of the invention of this application. For example, the contents of U.S. patent application Ser. No. 14/081,018, filed on Nov. 15, 2013 by the Applicant, can be an exemplary reference for this application.

Every touch screen possesses display characteristics including refresh rate and display resolution. Refresh rate commonly refers to the frequency of refreshing the screen, and is usually expressed in terms of the unit of frame per second (FPS). Taking the standards for analog televisions by the National Television System Committee (NTSC) for example, a touch sensitive screen has a refresh rate of 59.94 Hz and a resolution of 440×480 (440 by 480). The standard video graphic array (VGA)'s resolutions include 640×480 (640 by 480) and 320×200 (320 by 200) pixels, and their refresh rates include 50, 60, 70 Hz, etc. The common high resolution specification 1080P has a resolution of 1920× 1080 (1920 by 1080), and has refresh rates of 24, 25, 30, 60 Hz, etc.

In general, every pixel of a modern liquid crystal display (LCD) has a corresponding pixel electrode used to twist polarity of liquid crystal, thereby changing transmittance of the liquid crystal of the pixel. Therefore, the amount of light transmission of light-emitting diodes of different colors below the liquid crystal can be controlled, and it is used to further control the color of each pixel. Typically, screen display controller uses square waves to implement PWM (pulse width modulation). PWM could be used to control transparency of liquid crystal of each pixel. As mentioned by U.S. Pat. No. 8,421,828, polarity of liquid crystal layer is related to RMS (root-mean-square) of voltage applying to the liquid crystal layer. During human eye's visual persistent period, signal modulated by PWM could be applied to liquid crystal layer for controlling the polarity of the layer so as to control the transparency of the layer.

A resolution such as 640×480 represents that there are 640 pixels on each horizontal axis and 480 pixels on each vertical axis of the screen. To refresh or update a screen, usually pixels of the uppermost horizontal axis are refreshed first. From the left to the right side, and then from the uppermost to the lowest horizontal axis, until refreshing of all pixels of all the horizontal axes is finished, completing the refreshing of a frame. Under a display characteristic of a refresh rate of 60 Hz, refreshing of 60 frames in the screen must be finished in 1 second. Further, there may be a period during which the screen appears still, before refreshing the first pixel and after refreshing the last pixel of each horizontal axis, which period may be called a horizontal blank. And there may be a period during which the screen appears still when refreshing the screen with the next frame, which period may be called a vertical blank.

For example, the screen specification 1080P60 (with a refresh rate of 60 Hz) has vertical blank appearing every 16.667 ms or 1/60 second, and since there are 1080 horizontal axes, the screen specification has horizontal blank appearing every 15.4 us or 1/(60*1080) second.

As shown in FIG. 1, typical touch sensitive electrodes are usually laid out along horizontal and vertical axes of a touch sensitive screen 110. It may be assumed that a plurality of parallel touch sensitive electrodes stretching along the horizontal axis are referred to as first electrodes 121, and a plurality of parallel touch sensitive electrodes stretching along the vertical axis are referred to as second electrodes 122. These first and second electrodes are usually connected or coupled to a touch sensitive processor 130, which performs touch sensitive detections by mutual-capacitance and/or self-capacitance.

Due to limitations on the design and costs of making of a touch sensitive processor, the number of touch sensitive electrodes that can be connected to the touch sensitive processor is very limited, so the numbers of first electrodes and second electrodes are usually less than respective aspects of the resolution of the screen. Taking a touch sensitive screen size of about 50 inches for example, its horizontal axis length is about 1130 mm and vertical axis length is about 670 mm. If the spacing between two electrodes is set as 8 mm, the screen will contain about 83 first electrodes and 141 second electrodes. In case the specification of the touch sensitive screen is 1080P, horizontal axis length of each pixel is 0.59 mm, and vertical axis length of each pixel is 0.62 mm. In other words, each first electrode covers about 12 pixel horizontal axes.

FIG. 2 shows an enlarged view of a part of a touch screen. As shown in FIG. 2, the upper portion includes a circuit comprising horizontal first electrodes 121 and vertical second electrodes 122 laid out and interconnected in rhombus shape, and the lower portion includes a pixel array comprising individual pixels 210. Since the number of all pixels is very large, not all of the pixels of the pixel array are shown. In refreshing or updating a screen, the refreshing is performed by the unit of a pixel horizontal axis 220. In the embodiment shown in FIG. 2, it can be seen that each first electrode 121 covers 6 pixel horizontal axes 220, wherein pixel horizontal axis 221 is located between two first electrodes, and pixel horizontal axis 222 is covered by a first electrode.

It is common for a touch screen 110, touch sensitive processor 130 and display controller are operating independently. Touch sensitive processor 130 usually has no idea of the display characteristics of the touch screen 110 such as resolution and refresh rate. Moreover, touch sensitive processor 130 also has no information which the pixel horizontal axis of the touch screen 110 is updated by the display controller. Touch sensitive processor 130 may perform mutual capacitive detection by directing one first electrode 121 parallel to pixel horizontal axes to transmit multiple square waves as driving signal and directing all second electrodes 122 to receive sensing signal with regard to the driving signal. If coincidentally a pixel horizontal axis covered by the first electrode 121 is updated concurrently by the display controller, the polarity level of the pixel's liquid crystal would be severely affected since the driving signal is composed by square waves and the pixel update is also controlled by PWM signal such that the user of the touch screen may observe brightness abnormality around the first electrode 121. However, the detection period of the touch sensitive processor and the screen refresh are quite fast. The probability of observing brightness abnormality while mutual capacitive detection is performed is not high.

In performing mutual-capacitive detection, the touch sensitive processor 130 directs touch sensitive driving electrodes in turn to output driving signals and directs touch sensitive sensing electrodes to sense the driving signals. Since the touch sensitive processor's sensing circuits are more expensive than its driving circuits, in the above design the designer may choose the first electrodes whose quantity is less than that of the second electrodes as touch sensitive sensing electrodes, while using the second electrodes as touch sensitive driving electrodes.

When using second electrodes as touch sensitive driving electrodes to perform a full screen mutual-capacitive detection, the touch sensitive processor directs the second electrodes in turn to output alternative current (AC) pulse signal, such as square or rectangular waves or sinusoidal waves. When the frequency of the AC pulse signal is 200 kHz and each pulse lasts 30 periods, then the duration that each of the second electrodes outputs the pulse signal is 0.15 ms or 150 us, which is 30/200,000 seconds. Since there are 141 second electrodes, and switching from one second electrode to the next one to output the AC pulse signal takes some time, performing a full-screen mutual-capacitive detection requires at least about 0.02115 seconds, 21.15 ms, or 21150 us, which is much longer than the refresh time 15.4 us of each pixel horizontal axis. When the frequency of the AC pulse signal is 100 kHz, and each pulse lasts 30 periods, then the duration that each of the second electrodes outputs the pulse signal is 0.33 ms, which is 30/100,000 seconds. Since there are 141 second electrodes, and switching from one second electrode to the next one to output the pulse signal takes some time, performing a full-screen mutual-capacitive detection requires at least about 0.04653 seconds, 46.53 ms, or 46530 us, which is much longer than the refresh time 15.4 us of each pixel horizontal axis.

When using first electrodes and second electrodes to perform self-capacitive detection, the touch sensitive processor directs all first electrodes and all second electrodes respectively to output a driving signal, and to detect or measure the signal. If using the same AC pulse signal with 200 kHz and each pulse lasting 30 periods as the driving signal, the required time for all the first electrodes to output the signal is 0.15 ms, and the required time for all the second electrodes to output the signal is also 0.15 ms, which two periods total 0.3 ms or 300 us, which is much longer than the refresh time 15.4 us of each pixel horizontal axis.

Another detection mode is to perform self-capacitive detection first, followed by mutual-capacitive detection according to the result of the self-capacitive detection. For example, the touch sensitive processor may first use all first electrodes to perform self-capacitive detection for 0.15 ms, to discover that N first electrodes are touched. Subsequently, the touch sensitive processor may drive the N first electrodes in turn and find those touched areas according to the detection results of all the second electrodes. Under these conditions, the total required time is about (N+1)*0.15 ms. Even when eleven first electrodes are touched concurrently, assuming N to be 11, the total required time is about 1.8 ms, which is much longer than the refresh time 15.4 us of each pixel horizontal axis.

In addition to performing a detection of an external conductive object, the touch sensitive processor can use a method similar to a self-capacitive method to concurrently direct all first electrodes and all second electrodes to detect electromagnetic signal output by an active stylus. Assuming the electrical signal output by the active stylus is the same as the driving signal mentioned above, the total required time for detection of all touch sensitive electrodes is about 0.15 ms, which is longer than the refresh time 15.4 us of each pixel horizontal axis.

When refreshing a certain pixel horizontal axis, new pixel data will be sent to corresponding pixel electrodes of the pixel horizontal axis. Thus, the liquid crystal display area near the pixel horizontal axis will present larger electromagnetic interference (EMI) than that presented by a liquid crystal display area elsewhere, and the larger electromagnetic interference affects the touch sensitive electrode. In the above example, since each first electrode covers about 12 pixel horizontal axes, most pixel horizontal axes substantially interfere with only a first electrode, such as pixel horizontal axes 222 shown in FIG. 2. And few pixel horizontal axes are located between two first electrodes, such as pixel horizontal axes 221 shown in FIG. 2, substantially interfere with the two first electrodes rather than other farther first electrodes.

Since the touch sensitive processor responsible for touch sensitive detection is not connected to the display controller responsible for displaying, when refreshing a certain pixel horizontal axis, the touch sensitive processor cannot avoid performing touch sensitive detection on the first electrode covering the pixel horizontal axis to avoid receiving the EMI when refreshing the pixel horizontal axis. Therefore a purpose of the invention of this application is to provide a touch sensitive method of a touch sensitive processor, wherein detection is performed on multiple first or horizontal electrodes at appropriate intervals, followed by judging which first electrode's detection result is actually related to touch sensitive, or is actually not related to touch sensitive and therefore should be excluded from touch sensitive calculation, which exclusion can help the touch sensitive calculation avoid or reduce the EMI effects on the touch sensitive calculation.

Hence, one purpose of the present application is to provide a touch sensitive method applicable to a touch sensitive processor. The method determines sensing results of which horizontal electrodes are related to a real touch according to multiple sensing results separated with appropriate time intervals. Or the method determines sensing results of which horizontal electrodes are irrelevant to a real touch and exclude the irrelevant sensing results from touch sensitive calculations for reducing or alleviating electromagnetic interferences caused by pixel refreshing. Another purpose of the present application is to provide a touch sensitive method applicable to a touch sensitive processor for find out the appropriate time intervals mentioned above.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

In one embodiment, a touch sensitive method for reducing interference from pixel refreshing: comprising: performing a first detection via multiple sensing electrodes of a touch screen to generate multiple first detection values; after a time interval, performing a second detection via the multiple sensing electrodes to generate multiple second detection values; after the time interval, performing a third detection via the multiple sensing electrodes to generate multiple third detection values; adding the first detection values, the second detection values and the third detection values with respect to the multiple sensing electrodes up as multiple sums of detection values; determining that an external conductive object is approximating or touching the touch screen nearby a N-th sensing electrode among the multiple sensing electrodes according to the multiple sums; and determining a position of the external conductive object locates with respect to the multiple sensing electrodes according to one of the first detection values, the second detection values and the third detection values, wherein the multiple sensing electrodes are parallel to pixel horizontal axes of the touch screen.

In one example, the step for determining the position further comprises: excluding or ignoring the first detection value corresponding to a N−1th sensing electrode; and determining the position of the external conductive object with respect to the multiple sensing electrodes according to the first detection values.

In another example, the step for determining the position further comprises: excluding or ignoring the third detection value corresponding to a N+1th sensing electrode; and determining the position of the external conductive object with respect to the multiple sensing electrodes according to the third detection values.

In an alternative example, the step for determining the position further comprises: finding out a smallest one among the first detection value, the second detection value and the third detection value corresponding to the N-th sensing electrode; specifying which one detection of the first detection, the second detection and the third detection the smallest one is corresponding to; excluding or ignoring detection values of the specified detection corresponding to the N−1th and the N+1th sensing electrodes; and determining the position of the external conductive object with respect to the multiple sensing electrodes according to the detection values of the specified detection. In a variation, the step for determining the position further comprises: excluding or ignoring detection values of the specified detection corresponding to the N−2th and the N+2th sensing electrodes.

In one embodiment, a touch sensitive apparatus for reducing interference from pixel refreshing, comprising: a sensing circuit and a processor connecting to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby a N-th sensing electrode among the multiple sensing electrodes according to the multiple sums; and determining a position of the external conductive object locates with respect to the multiple sensing electrodes according to one of the first detection values, the second detection values and the third detection values. The multiple sensing electrodes are parallel to pixel horizontal axes of the touch screen.

In one example, the processor is further configured for: excluding or ignoring the first detection value corresponding to a N−1th sensing electrode; and determining the position of the external conductive object with respect to the multiple sensing electrodes according to the first detection values.

In another example, the processor is further configured for: excluding or ignoring the third detection value corresponding to a N+1th sensing electrode; and determining the position of the external conductive object with respect to the multiple sensing electrodes according to the third detection values.

In an alternative example, the processor is further configured for finding out a smallest one among the first detection value, the second detection value and the third detection value corresponding to the N-th sensing electrode; specifying which one detection of the first detection, the second detection and the third detection the smallest one is corresponding to; excluding or ignoring detection values of the specified detection corresponding to the N−1th and the N+1th sensing electrodes; and determining the position of the external conductive object with respect to the multiple sensing electrodes according to the detection values of the specified detection. In a variation, the processor is further configured for excluding or ignoring detection values of the specified detection corresponding to the N−2th and the N+2th sensing electrodes.

According to one embodiment, the present invention provides an electronic system for reducing interference from pixel refreshing, comprising: a touch screen and a touch sensitive apparatus connected to the touch screen. The touch sensitive apparatus comprises a sensing circuit and a processor connecting to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby a N-th sensing electrode among the multiple sensing electrodes according to the multiple sums; and determining a position of the external conductive object locates with respect to the multiple sensing electrodes according to one of the first detection values, the second detection values and the third detection values. The multiple sensing electrodes are parallel to pixel horizontal axes of the touch screen.

In one embodiment, a touch sensitive method for reducing interference from pixel refreshing, comprising: performing a first detection via multiple sensing electrodes of a touch screen to generate multiple first detection values; after a time interval, performing a second detection via the multiple sensing electrodes to generate multiple second detection values; and after the time interval; performing a third detection via the multiple sensing electrodes to generate multiple third detection values; adding the first detection values, the second detection values and the third detection values with respect to the multiple sensing electrodes up as multiple sums of detection values; determining that an external conductive object is approximating or touching the touch screen nearby at least two adjacent sensing electrodes according to the sums of detection values; and determining a position of the external conductive object locates with respect to the multiple sensing electrodes according to one of the first detection values, the second detection values and the third detection values, wherein the multiple sensing electrodes are parallel to pixel horizontal axes of the touch screen.

In one example, the step for determining the position further comprises: specifying which one of the first detection, the second detection and the third detection is corresponding to a largest detection value, which is the largest among the first detection value, the second detection value and the third detection value with respect to a sensing electrode neighboring the at least two adjacent electrodes; excluding or ignoring the detection value of the specified detection corresponding to the sensing electrode; and determining the position according to the specified detection.

In another example, the step for determining the position further comprises: excluding or ignoring a specified detection corresponding to each one of the at least two sensing electrodes, wherein the specified detection corresponding to the sensing electrode has a detection value which is the most different than the other detection values; excluding or ignoring a detection value corresponding to a sensing electrode neighboring to the at least two sensing electrodes of a non-excluded detection; and determining the position of the external conductive object with respect to the multiple sensing electrodes according to the non-excluded detection.

In an alternative example, the step for determining the position further comprises: calculating an average of two detection values corresponding to each one of the at least two sensing electrodes, wherein the two detection values are the closer two of the first detection value, the second detection value and the third detection; and determining the position of the external conductive object with respect to the multiple sensing electrodes according to the at least two averages.

In one embodiment, the present invention provides a touch sensitive apparatus for reducing interference from pixel refreshing, comprising: a sensing circuit and a processor connected to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby at least two adjacent sensing electrodes according to the sums of detection values; and determining a position of the external conductive object locates with respect to the multiple sensing electrodes according to one of the first detection values, the second detection values and the third detection values.

In one example, the processor is further configured for specifying which one of the first detection, the second detection and the third detection is corresponding to a largest detection value, which is the largest among the first detection value, the second detection value and the third detection value with respect to a sensing electrode neighboring the at least two adjacent electrodes; excluding or ignoring the detection value of the specified detection corresponding to the sensing electrode; and determining the position according to the specified detection.

In another example, the processor is further configured for excluding or ignoring a specified detection corresponding to each one of the at least two sensing electrodes, wherein the specified detection corresponding to the sensing electrode has a detection value which is the most different than the other detection values; excluding or ignoring a detection value corresponding to a sensing electrode neighboring to the at least two sensing electrodes of a non-excluded detection; and determining the position of the external conductive object with respect to the multiple sensing electrodes according to the non-excluded detection.

In an alternative example, the processor is further configured for calculating an average of two detection values corresponding to each one of the at least two sensing electrodes, wherein the two detection values are the closer two of the first detection value, the second detection value and the third detection; and determining the position of the external conductive object with respect to the multiple sensing electrodes according to the at least two averages.

In one embodiment, the present invention provides an electronic system for reducing interference from pixel refreshing, comprising: a touch screen and a touch sensitive apparatus connected to the touch screen. The touch sensitive apparatus comprises a sensing circuit and a processor connected to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby at least two adjacent sensing electrodes according to the sums of detection values; and determining a position of the external conductive object locates with respect to the multiple sensing electrodes according to one of the first detection values, the second detection values and the third detection values.

In one embodiment, a touch sensitive method is provided for obtaining a time interval. The touch sensitive method, comprising: setting a time interval; determining that there is no external conductive object approximating or touching a touch screen; performing three detections separated by the time intervals to generate multiple first detection values, multiple second detection values and multiple detection values, respectively; determining whether only one single maximum exists among each of the first detection, the second detection and the third detection; determining whether the three maximums are corresponding to three adjacent sensing electrodes if only one single maximum exists among each of the first detection, the second detection and the third detection; and storing the time interval if the three maximums are corresponding to three adjacent sensing electrodes, wherein the multiple sensing electrodes are parallel to pixel horizontal axes of the touch screen.

In one embodiment, the present invention provides a touch sensitive apparatus for obtaining a time interval, which can be used in a touch sensitive method for reducing interference from pixel refreshing. The touch sensitive apparatus comprising: a sensing circuit and a processor connecting to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for determining whether only one single maximum exists among each of the first detection, the second detection and the third detection; determining whether the three maximums are corresponding to three adjacent sensing electrodes if only one single maximum exists among each of the first detection, the second detection and the third detection; and storing the time interval if the three maximums are corresponding to three adjacent sensing electrodes, wherein the multiple sensing electrodes are parallel to pixel horizontal axes of the touch screen.

In one embodiment, the present invention provides an electronic system for obtaining a time interval, which can be used in a touch sensitive method for reducing interference from pixel refreshing. The electronic system comprising: a touch screen; a sensing circuit; and a processor connected to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configure for determining whether only one single maximum exists among each of the first detection, the second detection and the third detection; determining whether the three maximums are corresponding to three adjacent sensing electrodes if only one single maximum exists among each of the first detection, the second detection and the third detection; and storing the time interval if the three maximums are corresponding to three adjacent sensing electrodes, wherein the multiple sensing electrodes are parallel to pixel horizontal axes of the touch screen.

In summarized, the provided touch sensitive method, apparatus and electronic system can be used to reduce interference from pixel refreshing. Besides, the provided touch sensitive method, apparatus and electronic system can also be used to obtain a time interval, which can be utilized in a touch sensitive method for reducing interference from pixel refreshing.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein.

DETAILED DESCRIPTION OF THE PREFERRED EMBODIMENTS

Figure 1:
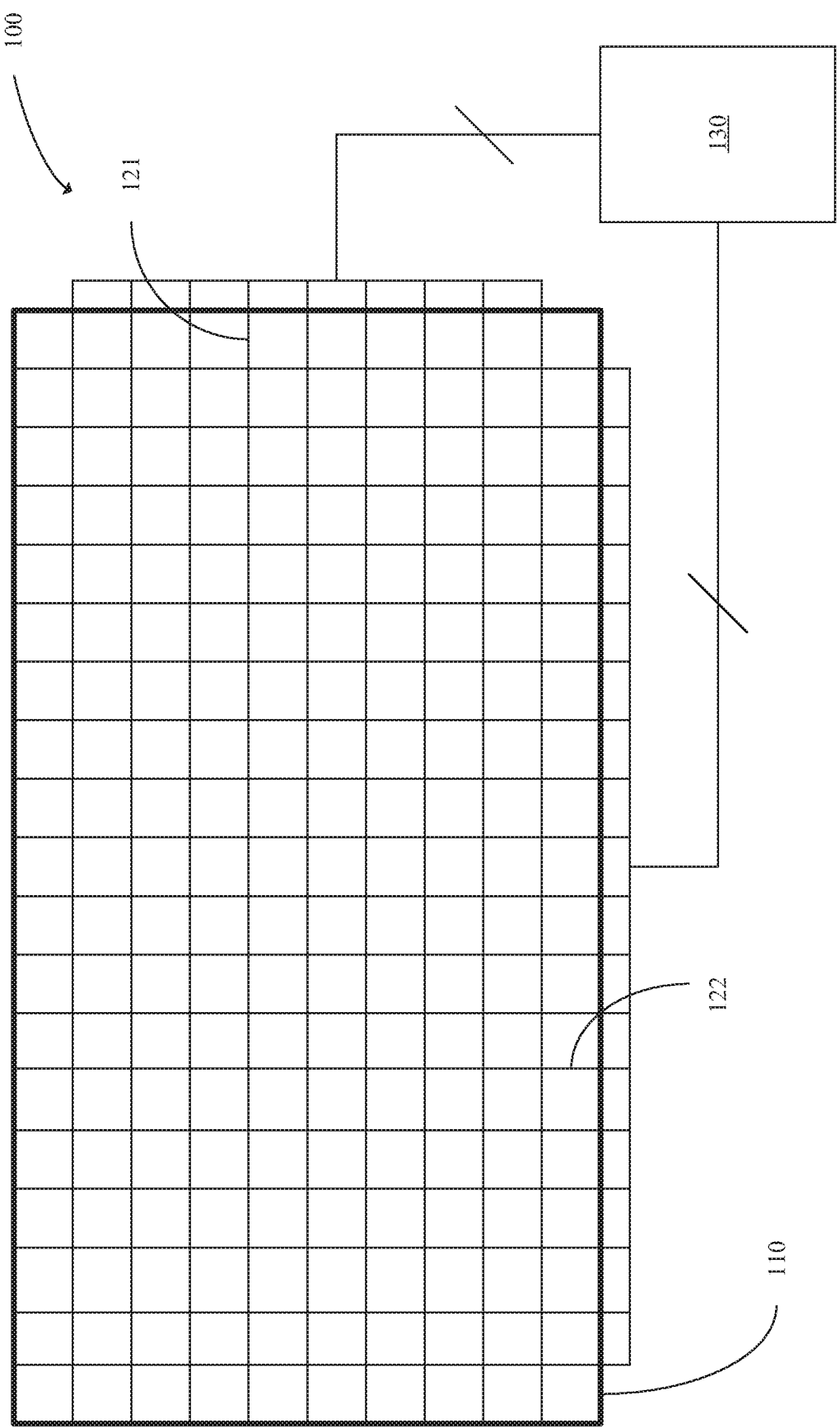
FIG. 1 is a diagram of a traditional touch sensitive electronic system.
Figure 2:
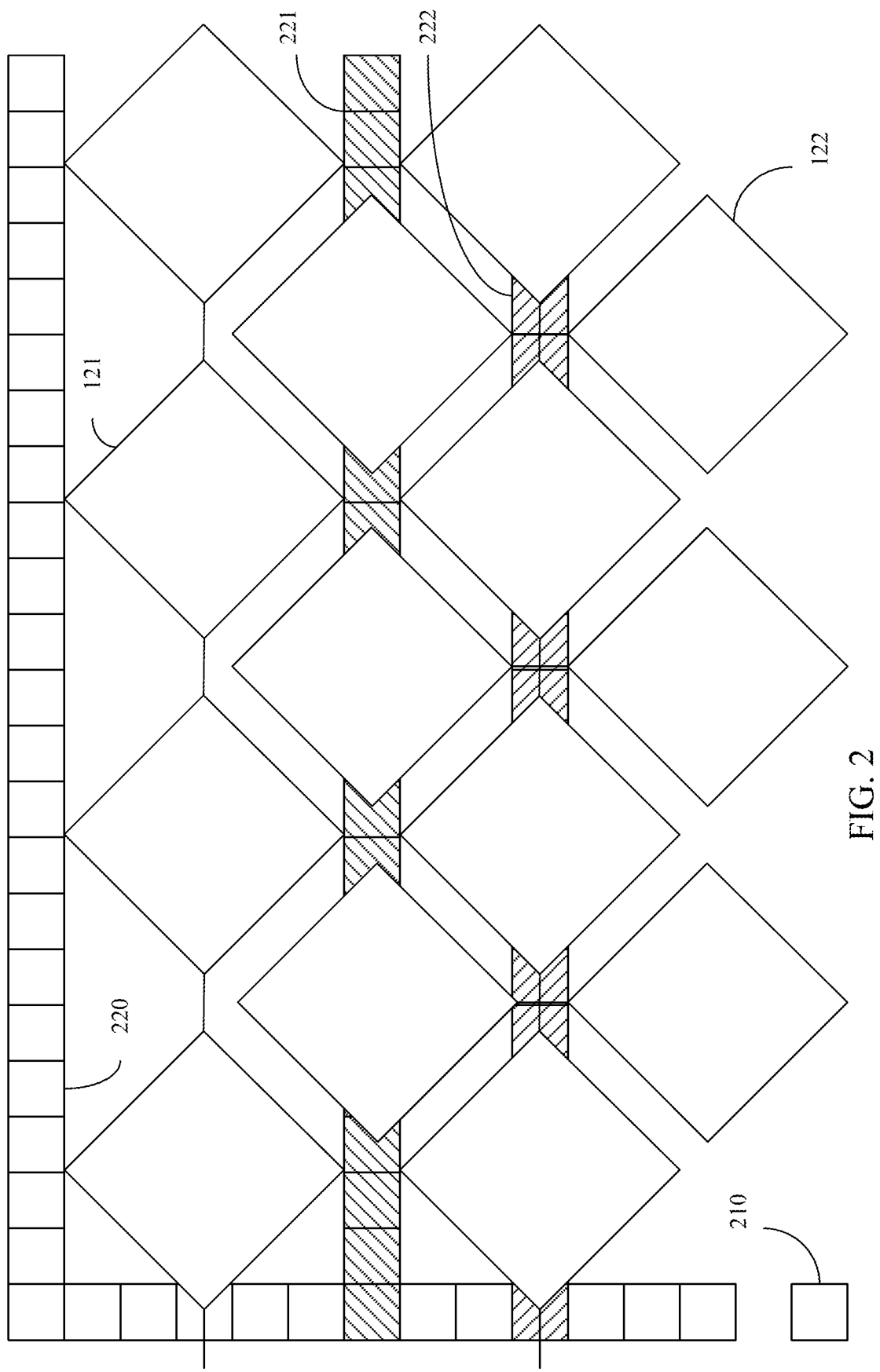
FIG. 2 depicts an enlarged view of a touch screen shown in the FIG. 1.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Table 1 shows the detection results according to an embodiment of the present invention. Referring to Table 1, (three) horizontal electrodes adjacent to each other detect for three times at appropriate intervals between the three detections. The detections of the first electrodes may refer to mutual-capacitive detection, self-capacitive detection, first mutual-capacitive detection followed by self-capacitive detection, or a detection of an active stylus, respectively mentioned above. The invention is not limited to embodiments using a particular type of detection, and is applicable when detection of touch sensitive electrodes is parallel to refreshing of pixel horizontal axes.

TABLE 1

|  | First detection | Second detection | Third detection | Result of judging |
| --- | --- | --- | --- | --- |
| (N − 1)-th horizontal electrode | EM Interfered by refreshing pixel horizontal axis | | | |
| N-th horizontal electrode | Touch sensitive signal | EM Interfered by refreshing pixel horizontal axis + Touch sensitive signal | Touch sensitive signal | Touch sensitive signal actually received |
| (N + 1)-th horizontal electrode | | | EM Interfered by refreshing pixel horizontal axis | |

In Table 1, when performing the first detection, it's the (N−1)-th horizontal electrode that is EM interfered caused by refreshing pixel horizontal axis, so the (N−1)-th first electrode produces the detection value, which may exceeds a certain threshold value. In addition, the N-th horizontal electrode has a touch sensitive signal produced by a real touch. If touch sensitive calculation is performed for only the first detection, the EMI suffered by the (N−1)-th horizontal electrode will be taken into account.

When performing the second detection after an appropriate time interval from the first detection, since refreshing of pixel horizontal axes in the screen has moved down the screen with time, it would be the N-th horizontal electrode that is EM interfered now. At the same time the touch sensitive signal is still detected or sensed by the N-th horizontal electrode, but not detected by both the (N−1)-th horizontal electrode and the (N+1)-th horizontal electrode.

Subsequently when performing the third detection after an interval from the second detection, since refreshing of pixel horizontal axes in the screen has further moved down the screen with time, it would be the (N+1)-th horizontal electrode that is EM interfered now. At the same time the touch sensitive signal is still detected or sensed by the N-th horizontal electrode, so the N-th horizontal electrode and the (N+1)-th horizontal electrode each produces a detection value.

After performing the three detections, the touch sensitive processor may discover from the results in Table 1 that the phenomenon of the EMI affects the (N−1)-th horizontal electrode, the N-th horizontal electrode, and the (N+1)-th horizontal electrode respectively with time. However, the N-th horizontal electrode produces a detection value in each of the three detections, so it may be judged that the detection values of the N-th horizontal electrode in the first and third detections are valid and could be used in the touch sensitive calculation.

In another embodiment, the touch sensitive processor can add up detection values of the three detections. And since the total detection value of the N-th horizontal electrode is the largest, it may be judged that the detection value of the N-th horizontal electrode is the actual touch sensitive signal.

Since the detection value of the second detection of the N-th horizontal electrode is the largest among its three detection values of the three detections, it may be appropriate to take the first or the third detection results/values into the touch sensitive calculation. Or it may be appropriate to take the smallest detection result/value into the touch sensitive calculation. In the touch sensitive calculation for a horizontal electrode, detection values of adjacent horizontal electrodes may be regarded as interferences and therefore ignored or not taken into account. For example, when taking the first and third detection results/values of the N-th horizontal electrode into the touch sensitive calculation, detection values of the (N−1)-th and (N+1)-th horizontal electrodes may be ignored.

In the embodiment as shown in Table 1, the time interval between detections may be a numerical value stored in advance. For example, in consumer electronic products, the user typically cannot change or adjust the resolution of a touch sensitive screen, so the touch sensitive processor may perform multiple detections at an interval stored in advance.

In other embodiments, the touch sensitive processor or its driver program may acquire the resolution, refresh rate, and size of the touch sensitive screen from the operating system of a subject electronic device to calculate the time required for refreshing a pixel horizontal axis. And, according to the number of pixel horizontal axes covered by each first electrode, the time interval may be set as being larger than or equal to the product of the required update time and the number of pixel horizontal axes. That is, the time interval between detections of two first electrodes may be set so as different horizontal electrode in the two detections being mostly interfered by refreshing of pixel horizontal axes. For example, in the above example(s), in case each horizontal electrode covers about 12 pixel horizontal axes, and the (refresh) time required to refresh each pixel horizontal axis is 15.4 us, then time interval between detections of two horizontal electrodes may be set as being larger than 184.8 us.

In some embodiments, if the touch sensitive processor cannot obtain the resolution, refresh rate, and/or size of the touch sensitive screen, it may dynamically adjust the time interval. For example, when the touch sensitive processor hasn't detected any touching object, it may adjust the time interval until detection results such as those in Table 2 appear.

TABLE 2

|  | First detection | Second detection | Third detection | Result of judging |
|---|---|---|---|---|
| (N − 1)-th horizontal electrode | EM Interfered by refreshing pixel horizontal axis | | | |
| N-th horizontal electrode | | EM Interfered by refreshing pixel horizontal axis | | |
| (N + 1)-th horizontal electrode | | | EM Interfered by refreshing pixel horizontal axis | |

Since the total amount of detection values of the three detections for each of the three horizontal electrodes are roughly the same and all the detection values appear in sequence between the three detections, so the touch sensitive processor may understand that the set time interval is appropriate. And afterwards the set time interval may be used as a set detection parameter.

In the embodiment as shown in Table 1, three detections must be performed and then the touch sensitive processor can perform the touch sensitive calculation according to correct detection results and then report a correct touched point to the operating system. However, in another embodiment, the touch sensitive calculation and the reporting may be performed in a pipeline. For example, it may be that the first instance of reporting is according to the first to third detections, the second instance of reporting is according to the second to fourth detections, the third instance of reporting is according to the third to fifth detections, and so on. So only the first instance of reporting takes longer to be performed, as the first instance of reporting must wait for the first three detections. And subsequently the other instances of reporting are performed sooner as each of them is performed only after an additional detection is done.

Table 3 shows the detection results according to another embodiment of the present invention. When each first electrode covers multiple pixel horizontal axes, detection results would usually be like those as shown in Table 1. However, in fewer instances or cases, when detections of the horizontal electrodes are with refreshing of pixel horizontal axes located between different horizontal electrodes, detection results would appear as shown in Table 3.

TABLE 3

| | First detection | Second detection | Third detection | Result of judging |
|---|---|---|---|---|
| (N − 1)-th horizontal electrode | some EM Interfered by refreshing pixel horizontal axis | | | |
| N-th horizontal electrode | some EM Interfered by refreshing pixel horizontal axis + Touch sensitive signal | some EM Interfered by refreshing pixel horizontal axis + Touch sensitive signal | Touch sensitive signal | Touch sensitive signal actually received |
| (N + 1)-th horizontal electrode | | some EM Interfered by refreshing pixel horizontal axis | some EM Interfered by refreshing pixel horizontal axis | |
| (N + 2)-th horizontal electrode | | | some EM Interfered by refreshing pixel horizontal axis | |

Referring to Table 3, when performing the first detection, it happens that pixel horizontal axes between the (N−1)-th and N-th horizontal electrodes are being refreshed, so both the (N−1)-th and N-th horizontal electrodes detect some interference due to the refreshing. When performing the second detection, coincidently pixel horizontal axes between the N-th and (N+1)-th horizontal electrodes are being refreshed, so both the N-th and (N+1)-th horizontal electrodes detect some interference due to the refreshing. When performing the last detection, coincidently pixel horizontal axes between the (N+1)-th and (N+2)-th horizontal electrodes are being refreshed, so both the (N+1)-th and (N+2)-th horizontal electrodes detect some interference due to the refreshing.

After adding up detection values of the three detections, the total detection value for the N-th horizontal electrode would still be higher than those for the other three first electrodes, so the touch sensitive processor regards the N-th horizontal electrode as the horizontal electrode that has received the touch sensitive signal.

Similarly, since the detection value of the third detection of the N-th horizontal electrode is the smallest among its three detections, it may be that the smallest detection value among the three detections is taken into calculation, or two detection values that are closer to each other among the three detections are ignored and excluded from the calculation. When performing touch sensitive calculation for a horizontal electrode, detection values of two adjacent horizontal electrodes may be regarded as interferences and therefore ignored or not considered. For example, when taking the third detection result/value of the N-th horizontal electrode into the touch sensitive calculation, detection values of the (N−2)-th, (N−1)-th, (N+1)-th, and (N+2)-th horizontal electrodes may be ignored.

Tables 4 and 5 show the detection results according to another embodiment of the present invention. Since the size of an external conductive object may be relatively large or be across two or more first electrodes, it's possible for detection results such as those shown in Tables 4 and 5 to occur.

TABLE 4

| | First detection | Second detection | Third detection | Result of judging |
|---|---|---|---|---|
| (N − 1)-th horizontal electrode | EM Interfered by refreshing pixel horizontal axis + Touch sensitive signal | Touch sensitive signal | Touch sensitive signal | Touch sensitive signal actually received |
| N-th horizontal electrode | Touch sensitive signal | EM Interfered by refreshing pixel horizontal axis + Touch sensitive signal | Touch sensitive signal | Touch sensitive signal actually received |
| (N + 1)-th horizontal electrode | | | EM Interfered by refreshing pixel horizontal axis | |

In the embodiment as shown in Table 4, the (N−1)-th and N-th horizontal electrodes have detected a touch sensitive signal. Similarly, in the embodiment as shown in Table 5, the N-th and (N+1)-th horizontal electrodes have detected a touch sensitive signal.

TABLE 5

| | First detection | Second detection | Third detection | Result of judging |
|---|---|---|---|---|
| (N − 1)-th horizontal electrode | EM Interfered by refreshing pixel horizontal axis | | | |
| N-th horizontal electrode | Touch sensitive signal | EM Interfered by refreshing pixel horizontal axis + Touch sensitive signal | Touch sensitive signal | Touch sensitive signal actually received |
| (N + 1)-th horizontal electrode | Touch sensitive signal | Touch sensitive signal | EM Interfered by refreshing pixel horizontal axis | Touch sensitive signal actually received |

The touch sensitive processor may judge that two horizontal electrodes adjacent to each other have received a touch sensitive signal, according to a sum result across the three detections. In the embodiment as shown in Table 4, the sum of detection values for the (N−1)-th and N-th horizontal electrodes is larger than that for the (N+1)-th horizontal electrode, so it may be judged that it's the (N−1)-th and N-th horizontal electrodes, rather than the (N+1)-th horizontal electrode, that have received the touch sensitive signal. In the embodiment as shown in Table 5, the sum of detection values for the N-th and (N+1)-th horizontal electrodes is larger than that for the (N−1)-th horizontal electrode, so it may be judged that it's the N-th and (N+1)-th horizontal electrodes, rather than the (N−1)-th horizontal electrode, that have received the touch sensitive signal.

In one embodiment, it may be that the detection result indicating that the horizontal electrode that hasn't received a touch sensitive signal has been interfered is taken into touch sensitive calculation. For example, in the embodiment as shown in Table 4, the (N+1)-th horizontal electrode hasn't received a touch sensitive signal and produces a detection value during the third detection due to being interfered, so the detection result of the third detection is used in touch sensitive calculation, while the detection value of the (N+1)-th horizontal electrode should be ignored. For another example, in the embodiment as shown in Table 5, the (N−1)-th horizontal electrode hasn't received a touch sensitive signal and produces a detection value during the first detection due to being interfered, so the detection result of the first detection is used in touch sensitive calculation, while the detection value of the (N−1)-th horizontal electrode should be ignored.

In another embodiment, it may be that similarity between detection values of a first electrode that has received a touch sensitive signal is taken into account in touch sensitive calculation. For example, in the embodiment as shown in Table 4, the second and third detection values of the (N−1)-th horizontal electrode are similar, and the first and third detection values of the N-th horizontal electrode are similar, so the third detection result(s) is used in touch sensitive calculation. For another example, in the embodiment as shown in Table 5, the first and third detection values of the N-th horizontal electrode are similar, and the first and second detection values of the (N+1)-th horizontal electrode are similar, so the first detection result(s) is used in touch sensitive calculation.

In still another embodiment, it may be that the average of similar detection values of a horizontal electrode that has received a touch sensitive signal is taken into account in touch sensitive calculation. For example, in the embodiment as shown in Table 4, the second and third detection values of the (N−1)-th horizontal electrode are similar, and the first and third detection values of the N-th horizontal electrode are similar, so the average of the second and third detection values of the (N−1)-th horizontal electrode and the average of the first and third detection values of the N-th horizontal electrode are used in touch sensitive calculation. For another example, in the embodiment as shown in Table 5, the first and third detection values of the N-th horizontal electrode are similar, and the first and second detection values of the (N+1)-th horizontal electrode are similar, so the average of the first and third detection values of the N-th horizontal electrode and the average of the first and second detection values of the (N+1)-th horizontal electrode are used in touch sensitive calculation.

A person of ordinary skill in the art can understand that although only three detections are performed or described as examples in these embodiments as shown in Tables 1 to 5, the scope of this invention isn't limited to embodiments in which only three detections are performed and encompasses embodiments in which more than three detections performed or applicable. So, a person of ordinary skill in the art should be able to apply more detections according to the contents of the invention described herein.

In summarized, this application provides a touch sensitive method of a touch sensitive processor, wherein multiple detections are performed on horizontal electrodes at appropriate intervals, followed by judging which horizontal electrode's detection result is actually related to touch sensitive, or is actually not related to touch sensitive and therefore should be excluded from touch sensitive calculation, which exclusion can help the touch sensitive calculation to avoid the EMI effects due to refreshing of pixel horizontal axes or reduce the EMI effects on the touch sensitive calculation.

Figure 3A:
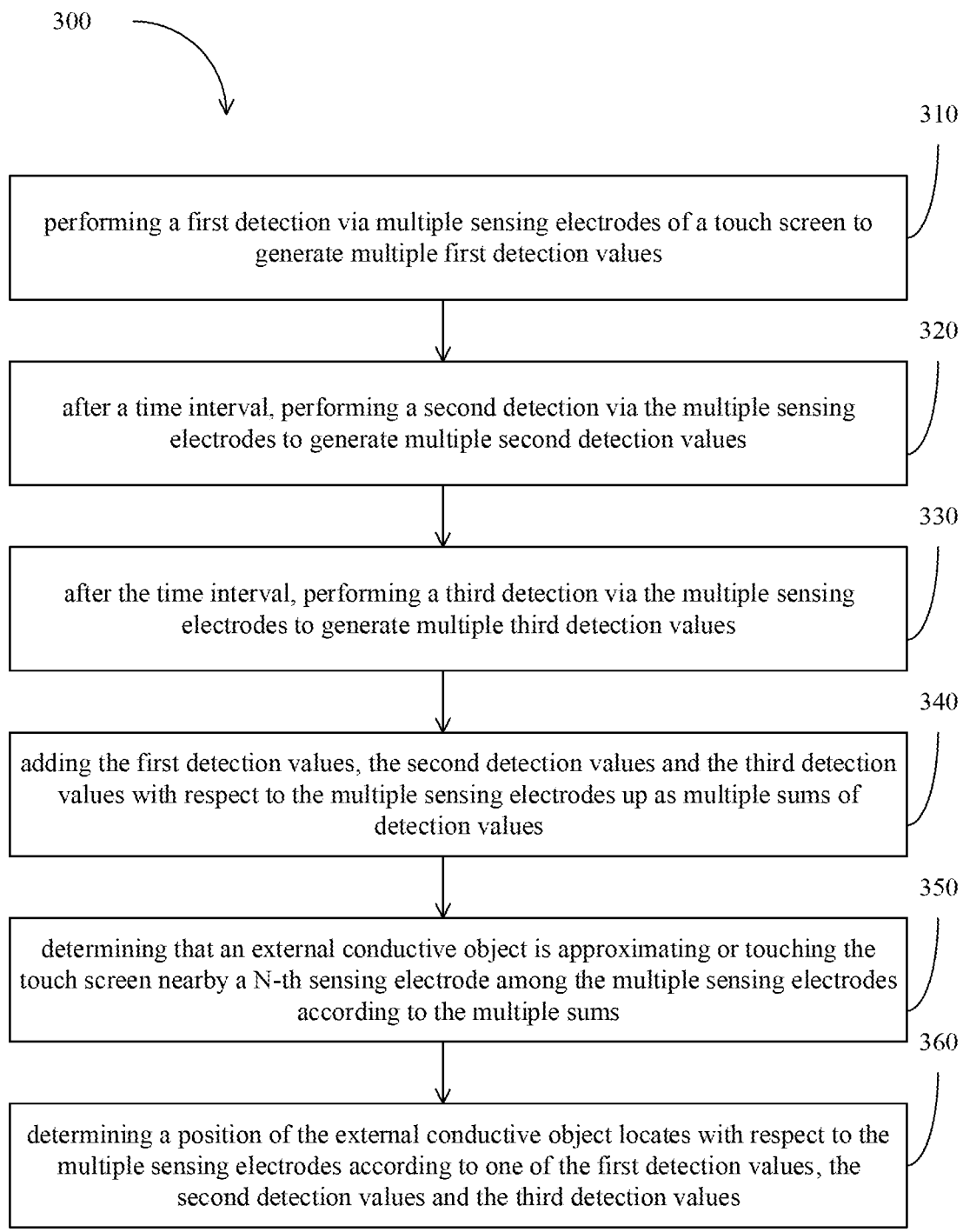
FIG. 3A shows a flowchart diagram of a touch sensitive method 300 in accordance with an embodiment of the present invention.

Please refer to FIG. 3A which shows a flowchart diagram of a touch sensitive method 300 in accordance with the present invention. The method can be supported by the embodiments of Table 1 and Table 3. The touch sensitive method 300 includes but not limit to the following steps. Step 310: performing a first detection via multiple sensing electrodes of a touch screen to generate multiple first detection values; Step 320: after a time interval, performing a second detection via the multiple sensing electrodes to generate multiple second detection values; Step 330: after the time interval, performing a third detection via the multiple sensing electrodes to generate multiple third detection values; Step 340: adding the first detection values, the second detection values and the third detection values with respect to the multiple sensing electrodes up as multiple sums of detection values; Step 350: determining that an external conductive object is approximating or touching the touch screen nearby a N-th sensing electrode among the multiple sensing electrodes according to the multiple sums; Step 360: determining a position of the external conductive object locates with respect to the multiple sensing electrodes according to one of the first detection values, the second detection values and the third detection values. The multiple sensing electrodes are parallel to pixel horizontal axes of the touch screen.

Figure 3B:
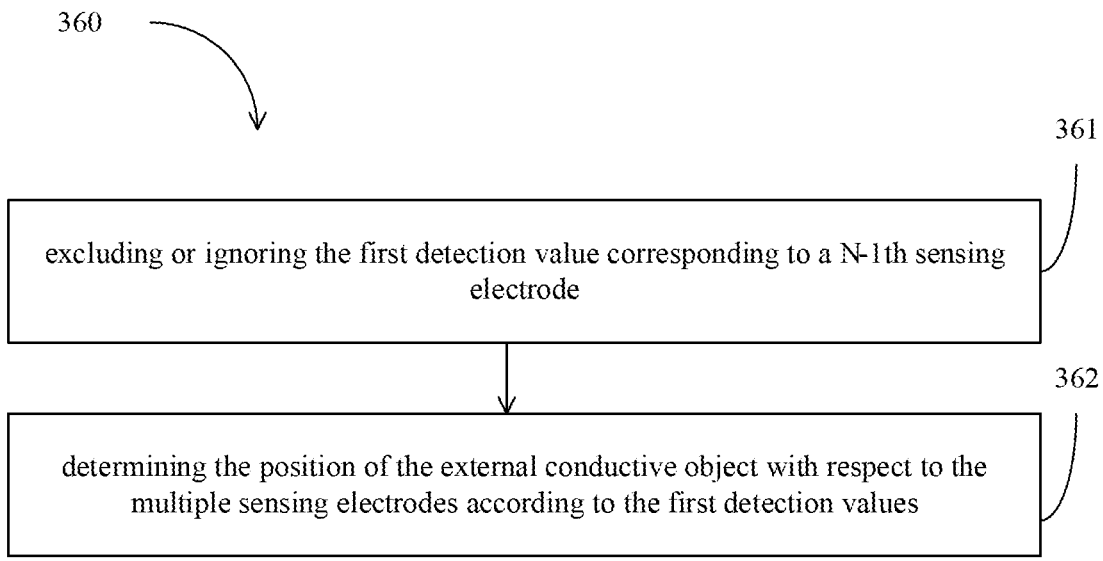
FIG. 3B-3D shows detailed flowchart diagrams of step 360 in accordance with embodiments of the present invention.
Figure 3C:
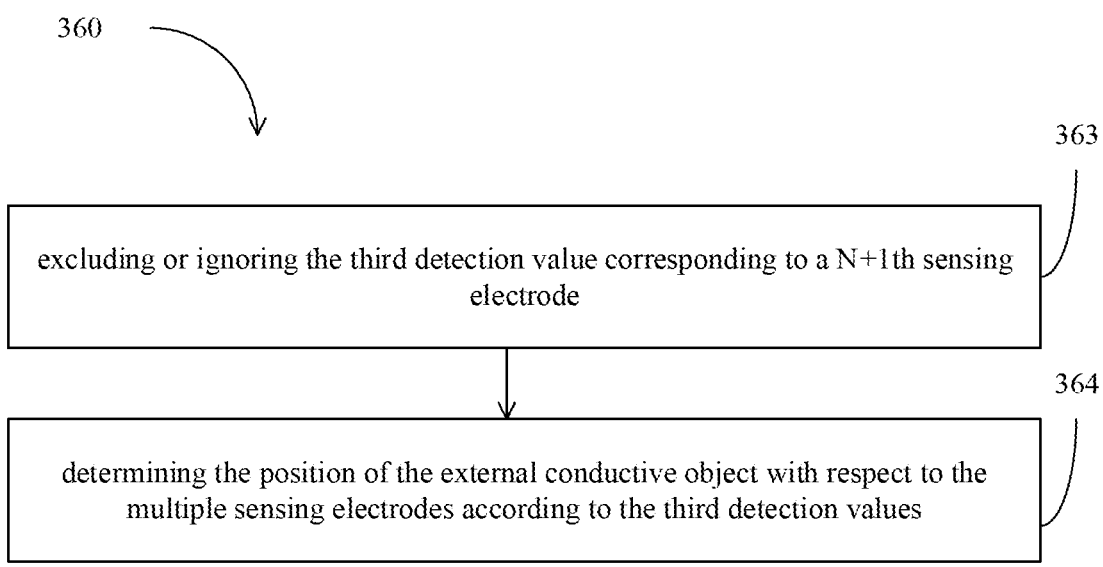
Figure 3D:
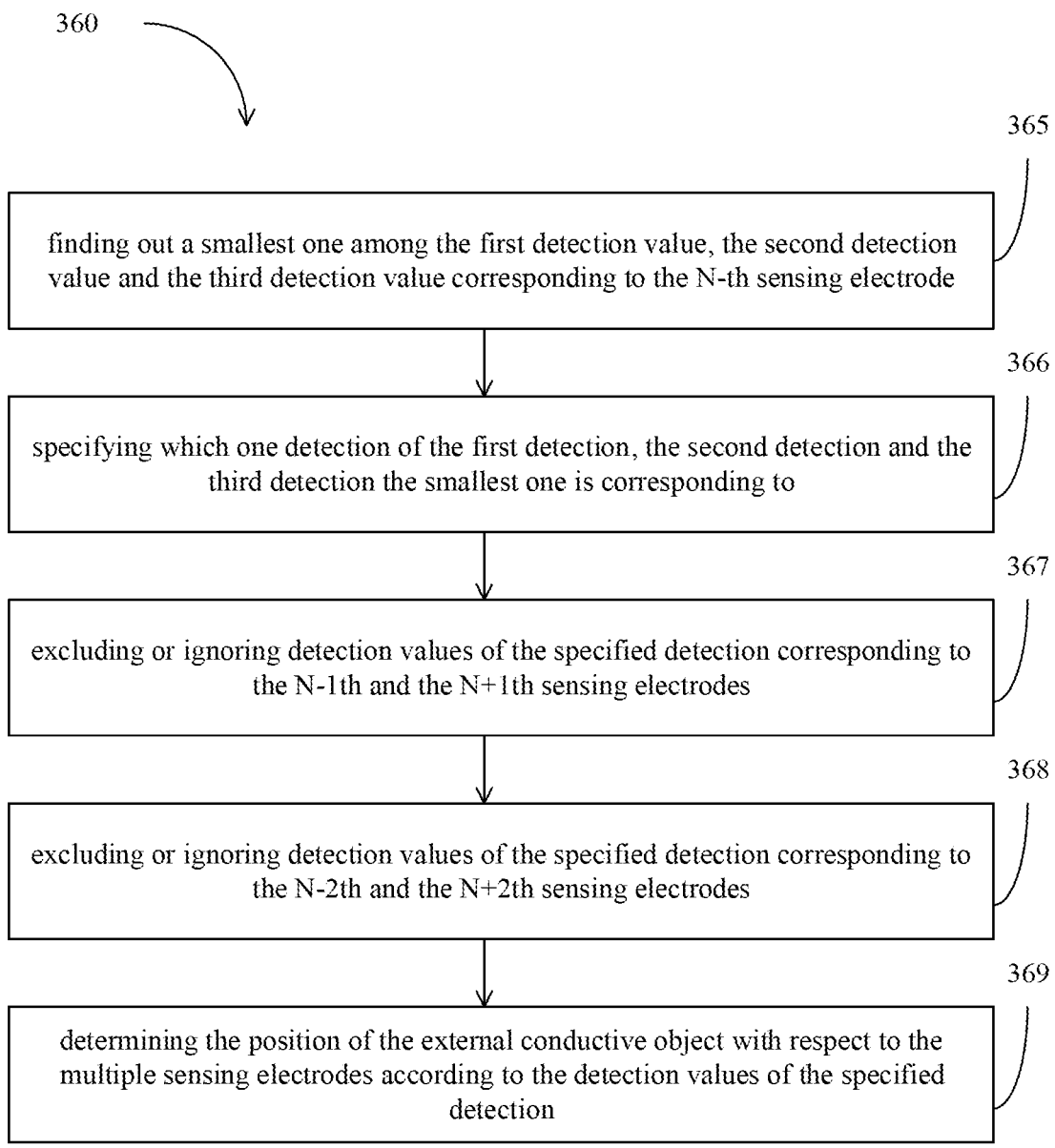

The step 360 may further include three embodiments. Please refer to FIG. 3B, which depicts a flowchart diagram of the step 360 in accordance with a first embodiment of the present invention. In this first embodiment, Step 361: excluding or ignoring the first detection value corresponding to a N−1th sensing electrode; and Step 362: determining the position of the external conductive object with respect to the multiple sensing electrodes according to the first detection values. Please refer to FIG. 3C, which depicts a flowchart diagram of the step 360 in accordance with a second embodiment of the present invention. In this second embodiment, Step 363: excluding or ignoring the third detection value corresponding to a N+1th sensing electrode; and Step 364: determining the position of the external conductive object with respect to the multiple sensing electrodes according to the third detection values. Please refer to FIG. 3D, which depicts a flowchart diagram of the step 360 in accordance with a third embodiment of the present invention. In this third embodiment, Step 365: finding out a smallest one among the first detection value, the second detection value and the third detection value corresponding to the N-th sensing electrode; Step 366: specifying which one detection of the first detection, the second detection and the third detection the smallest one is corresponding to; Step 367: excluding or ignoring detection values of the specified detection corresponding to the N−1th and the N+1th sensing electrodes; optional Step 368: excluding or ignoring detection values of the specified detection corresponding to the N−2th and the N+2th sensing electrodes; Step 369: determining the position of the external conductive object with respect to the multiple sensing electrodes according to the detection values of the specified detection.

According to one embodiment of the present invention, the touch sensitive method 300 can be executed or implemented by the touch sensitive processor 130 shown in the FIG. 1. The touch sensitive processor 130 may comprise a sensing circuit connecting to the multiple sensing electrodes for implementing the steps 310, 320 and 330. The touch sensitive processor 130 may comprise a processor connecting to the sensing circuit for implementing the steps 340, 350 and 360 and steps 361-369 described in the three embodiments of the step 360. The processor may be an embedded processor or a separate processor which executes software or instructions to fulfill the steps.

In other words, according to the mentioned embodiment, the present invention provides a touch sensitive apparatus for reducing interference from pixel refreshing, comprising: a sensing circuit and a processor connecting to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby a N-th sensing electrode among the multiple sensing electrodes according to the multiple sums; and determining a position of the external conductive object locates with respect to the multiple sensing electrodes according to one of the first detection values, the second detection values and the third detection values. The multiple sensing electrodes are parallel to pixel horizontal axes of the touch screen.

In one embodiment, the processor is further configured for: excluding or ignoring the first detection value corresponding to a N−1th sensing electrode; and determining the position of the external conductive object with respect to the multiple sensing electrodes according to the first detection values. In another embodiment, the processor is further configured for: excluding or ignoring the third detection value corresponding to a N+1th sensing electrode; and determining the position of the external conductive object with respect to the multiple sensing electrodes according to the third detection values. In an embodiment, the processor is further configured for finding out a smallest one among the first detection value, the second detection value and the third detection value corresponding to the N-th sensing electrode; specifying which one detection of the first detection, the second detection and the third detection the smallest one is corresponding to; excluding or ignoring detection values of the specified detection corresponding to the N−1th and the N+1th sensing electrodes; and determining the position of the external conductive object with respect to the multiple sensing electrodes according to the detection values of the specified detection. In a variation, the processor is further configured for excluding or ignoring detection values of the specified detection corresponding to the N−2th and the N+2th sensing electrodes.

According to one embodiment, the present invention provides an electronic system for reducing interference from pixel refreshing, comprising: a touch screen and a touch sensitive apparatus connected to the touch screen. The touch sensitive apparatus comprises a sensing circuit and a processor connecting to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby a N-th sensing electrode among the multiple sensing electrodes according to the multiple sums; and determining a position of the external conductive object locates with respect to the multiple sensing electrodes according to one of the first detection values, the second detection values and the third detection values. The multiple sensing electrodes are parallel to pixel horizontal axes of the touch screen.

Figure 4A:
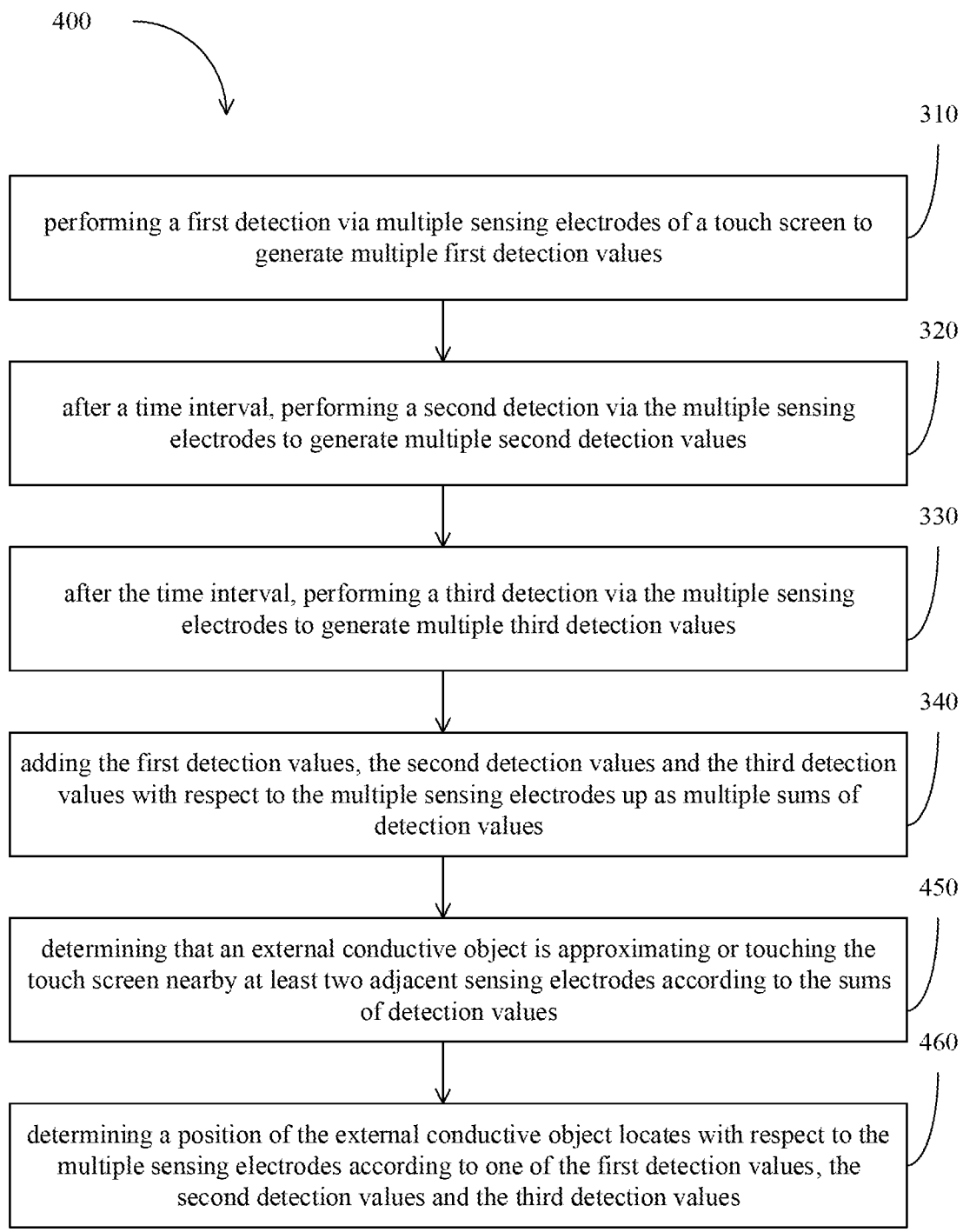
FIG. 4A shows a flowchart diagram of a touch sensitive method 400 in accordance with an embodiment of the present invention.

Please refer to FIG. 4A, which depicts a flowchart diagram of a touch sensitive method 400 in accordance with an embodiment of the present invention. The method may be supported by the embodiments of Table 4 and Table 5. The touch sensitive method 400 includes but not limits to the following steps: The steps 310, 320, 330 and 340 are identical to those steps shown in the FIG. 3A. Hence no duplicated descriptions are elaborated here. Step 450: determining that an external conductive object is approximating or touching the touch screen nearby at least two adjacent sensing electrodes according to the sums of detection values. For example, it could be determined that an external conductive object is approximating or touching the touch screen nearby two adjacent sensing electrodes if the detection values corresponding to these at least two adjacent sensing electrodes are larger than a threshold. Or it could be determined that an external conductive object is approximating or touching the touch screen nearby two adjacent sensing electrodes if both differences between these at least two adjacent detection values and their respective neighboring detection values are larger than another threshold. Next, step 460: determining a position of the external conductive object locates with respect to the multiple sensing electrodes according to one of the first detection values, the second detection values and the third detection values. In the embodiment of Table 4, the step 450 can determine that the N−1th and the N-th sensing electrodes are the at least two adjacent sensing electrodes. In the embodiment of Table 5, the step 450 can determine that the Nth and the N+1-th sensing electrodes are the at least two adjacent sensing electrodes.

Figure 4B:
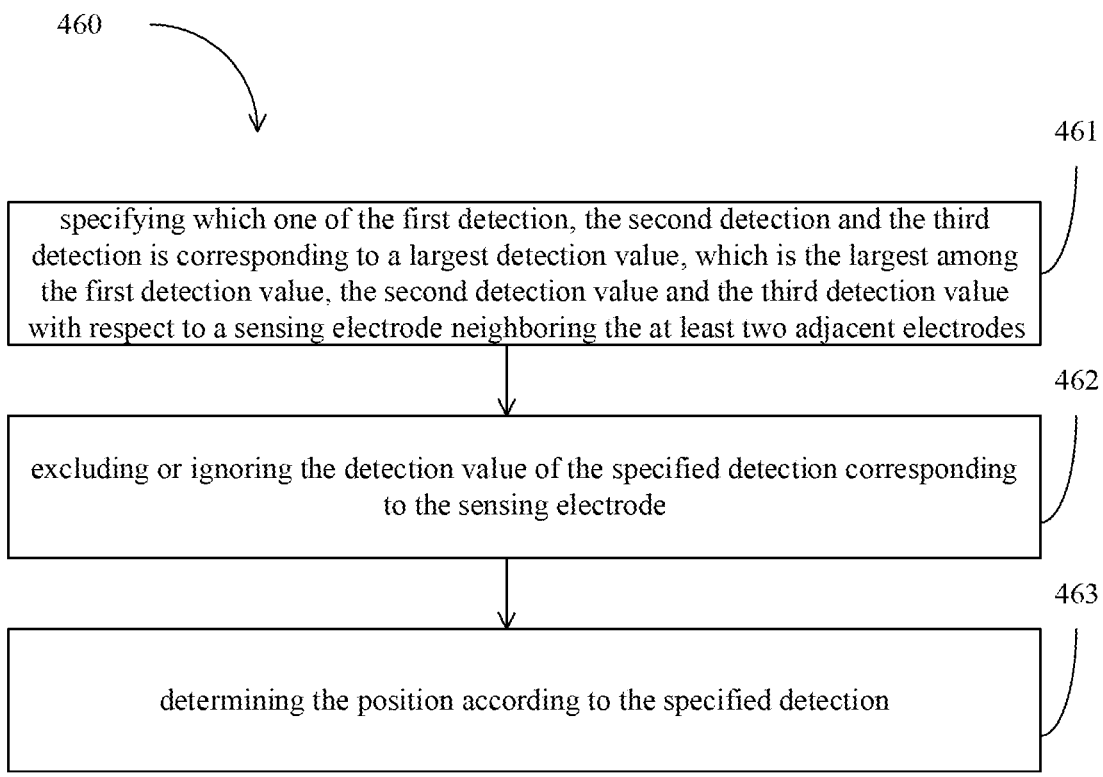
FIG. 4B-4D shows detailed flowchart diagrams of step 460 in accordance with embodiments of the present invention.

Please refer to FIG. 4B, which is a detailed flowchart diagram of the step 460 in accordance with a first embodiment. Step 461: specifying which one of the first detection, the second detection and the third detection is corresponding to a largest detection value, which is the largest among the first detection value, the second detection value and the third detection value with respect to a sensing electrode neighboring the at least two adjacent electrodes. Step 462: excluding or ignoring the detection value of the specified detection corresponding to the sensing electrode. Step 463: determining the position according to the specified detection. For example, in the embodiment of Table 4, the sensing electrode identified by the step 461 is the N+1-th sensing electrode which is neighboring to the N−1th and the N-th sensing electrodes. The largest detection value among the first detection value, the second detection value and the third detection value corresponding to the N+1-th sensing electrode is the third detection value. Therefore the third detection is specified in the step 461. Next, in step 462, the detection value of the third detection corresponding to the N+1-th sensing electrode (i.e. interference from pixel refreshing) is excluded or ignored. Last, in step 463, the position of the external conductive object with respect to the multiple sensing electrodes is determined according to the multiple third detection values. For another example, in the embodiment of Table 5, the sensing electrode identified by the step 461 is the N−1-th sensing electrode which is neighboring to the Nth and the N+1-th sensing electrodes. The largest detection value among the first detection value, the second detection value and the third detection value corresponding to the N−1-th sensing electrode is the first detection value. Next, in step 462, the detection value of the first detection corresponding to the N−1-th sensing electrode (i.e. interference from pixel refreshing) is excluded or ignored. Last, in step 463, the position of the external conductive object with respect to the multiple sensing electrodes is determined according to the multiple first detection values.

Figure 4C:
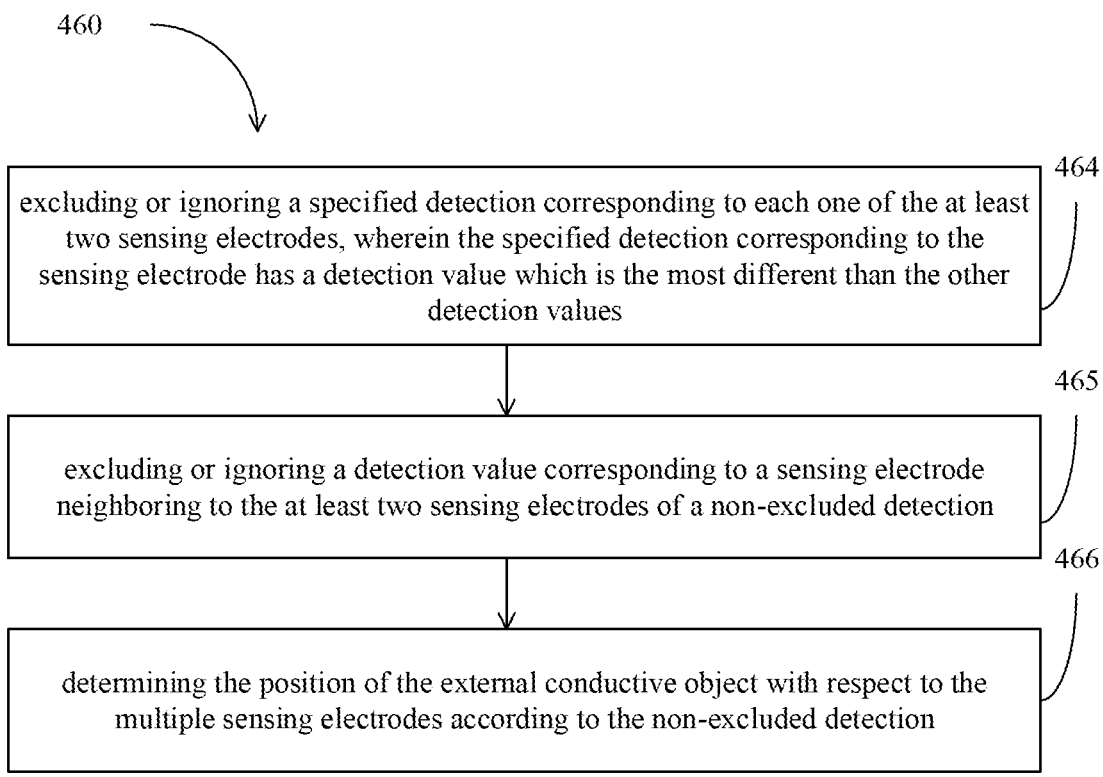

Please refer to FIG. 4C, which is a detailed flowchart diagram of the step 460 in accordance with a second embodiment. Step 464: excluding or ignoring a specified detection corresponding to each one of the at least two sensing electrodes, wherein the specified detection corresponding to the sensing electrode has a detection value which is the most different than the other detection values. Step 465: excluding or ignoring a detection value corresponding to a sensing electrode neighboring to the at least two sensing electrodes of a non-excluded detection. Step 466: determining the position of the external conductive object with respect to the multiple sensing electrodes according to the non-excluded detection. For example, in step 464 of the embodiment of Table 4, the first detection value of the N−1-th sensing electrode is the most different than the other two detection values, thus the first detection values are excluded or ignored. And the second detection value of the N-th sensing value is the most different than the other two detection values, thus the second detection values are excluded or ignored. In step 465, excluding or ignoring the detection value of neighboring sensing electrode (the N+1-th sensing electrode) of the non-excluded third detection values. Last in step 466, the position of the external conductive object with respect to the multiple sensing electrodes is determined according to the third detection values. For example, in step 464 of the embodiment of Table 5, the second detection value of the N-th sensing electrode is the most different than the other two detection values, thus the second detection values are excluded or ignored. The third detection value of the N+1 sensing electrode is the most different than the other two detection values, thus the third detection values are excluded or ignored. In step 465, excluding or ignoring the detection value of neighboring sensing electrode (the N−1-th sensing electrode) of the non-excluded first detection values. Last, in step 466, the position of the external conductive object with respect to the multiple sensing electrodes is determined according to the first detection values.

Figure 4D:
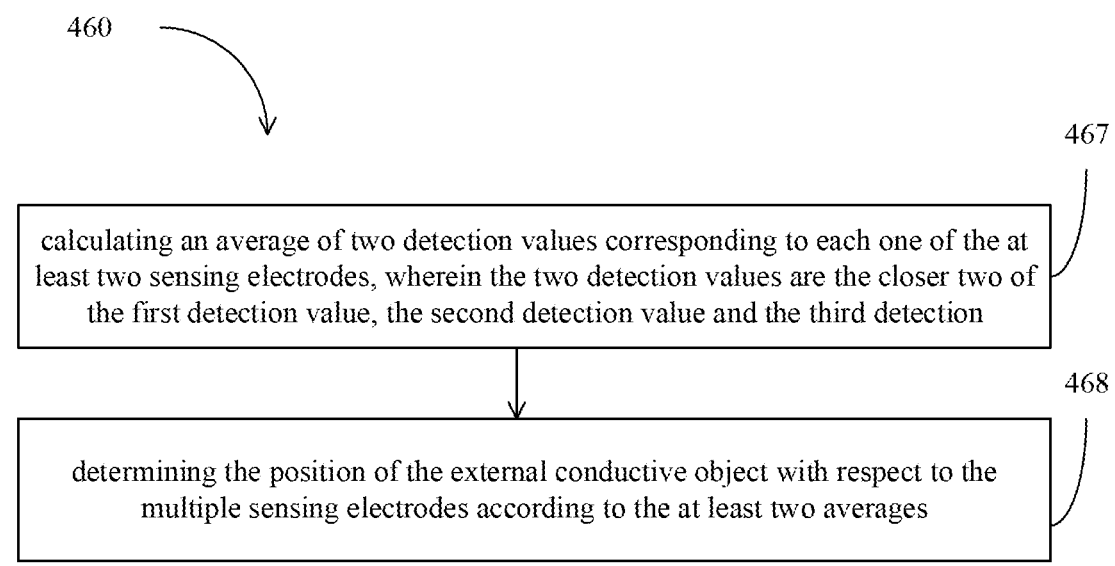

Please refer to FIG. 4D, which is a detailed flowchart diagram of the step 460 in accordance with a third embodiment. Step 467: calculating an average of two detection values corresponding to each one of the at least two sensing electrodes, wherein the two detection values are the closer two of the first detection value, the second detection value and the third detection. In other words, the rest one of them is the most different than the chosen detection values. Step 468: determining the position of the external conductive object with respect to the multiple sensing electrodes according to the at least two averages. For example, in the embodiment of Table 4, the last two detection values corresponding to the N−1-th sensing electrode are closer to each other, and the first and the third detection values corresponding to the N-th sensing electrode are closer to each other. Thus, in step 467, an average of the last two detection values corresponding to the N−1-th sensing electrode is calculated. Another average of the first and the third detection values corresponding to the N-th sensing electrode is calculated. For example, in the embodiment of Table 5, the first and the second detection values corresponding to the N-th sensing electrode are closer to each other. And the first and the third detection values corresponding to the N+1-th sensing electrode are closer to each other. Hence, in step 467, an average of the first and the third detection values corresponding to the N-th sensing electrode is calculated. And another average of the first and the second detection values corresponding to the N+1-th sensing electrode is calculated.

In one embodiment, the present invention provides a touch sensitive apparatus for reducing interference from pixel refreshing, comprising: a sensing circuit and a processor connected to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby at least two adjacent sensing electrodes according to the sums of detection values; and determining a position of the external conductive object locates with respect to the multiple sensing electrodes according to one of the first detection values, the second detection values and the third detection values.

In one example, the processor is further configured for specifying which one of the first detection, the second detection and the third detection is corresponding to a largest detection value, which is the largest among the first detection value, the second detection value and the third detection value with respect to a sensing electrode neighboring the at least two adjacent electrodes; excluding or ignoring the detection value of the specified detection corresponding to the sensing electrode; and determining the position according to the specified detection.

In another example, the processor is further configured for excluding or ignoring a specified detection corresponding to each one of the at least two sensing electrodes, wherein the specified detection corresponding to the sensing electrode has a detection value which is the most different than the other detection values; excluding or ignoring a detection value corresponding to a sensing electrode neighboring to the at least two sensing electrodes of a non-excluded detection; and determining the position of the external conductive object with respect to the multiple sensing electrodes according to the non-excluded detection.

In an alternative example, the processor is further configured for calculating an average of two detection values corresponding to each one of the at least two sensing electrodes, wherein the two detection values are the closer two of the first detection value, the second detection value and the third detection; and determining the position of the external conductive object with respect to the multiple sensing electrodes according to the at least two averages.

In one embodiment, the present invention provides an electronic system for reducing interference from pixel refreshing, comprising: a touch screen and a touch sensitive apparatus connected to the touch screen. The touch sensitive apparatus comprises a sensing circuit and a processor connected to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for adding the first detection values, the second detection values and the third detection values with respect to the multiple sensing electrodes up as multiple sums of detection values; determining that an external conductive object is approximating or touching the touch screen nearby at least two adjacent sensing electrodes according to the sums of detection values; and determining a position of the external conductive object locates with respect to the multiple sensing electrodes according to one of the first detection values, the second detection values and the third detection values.

Figure 5:
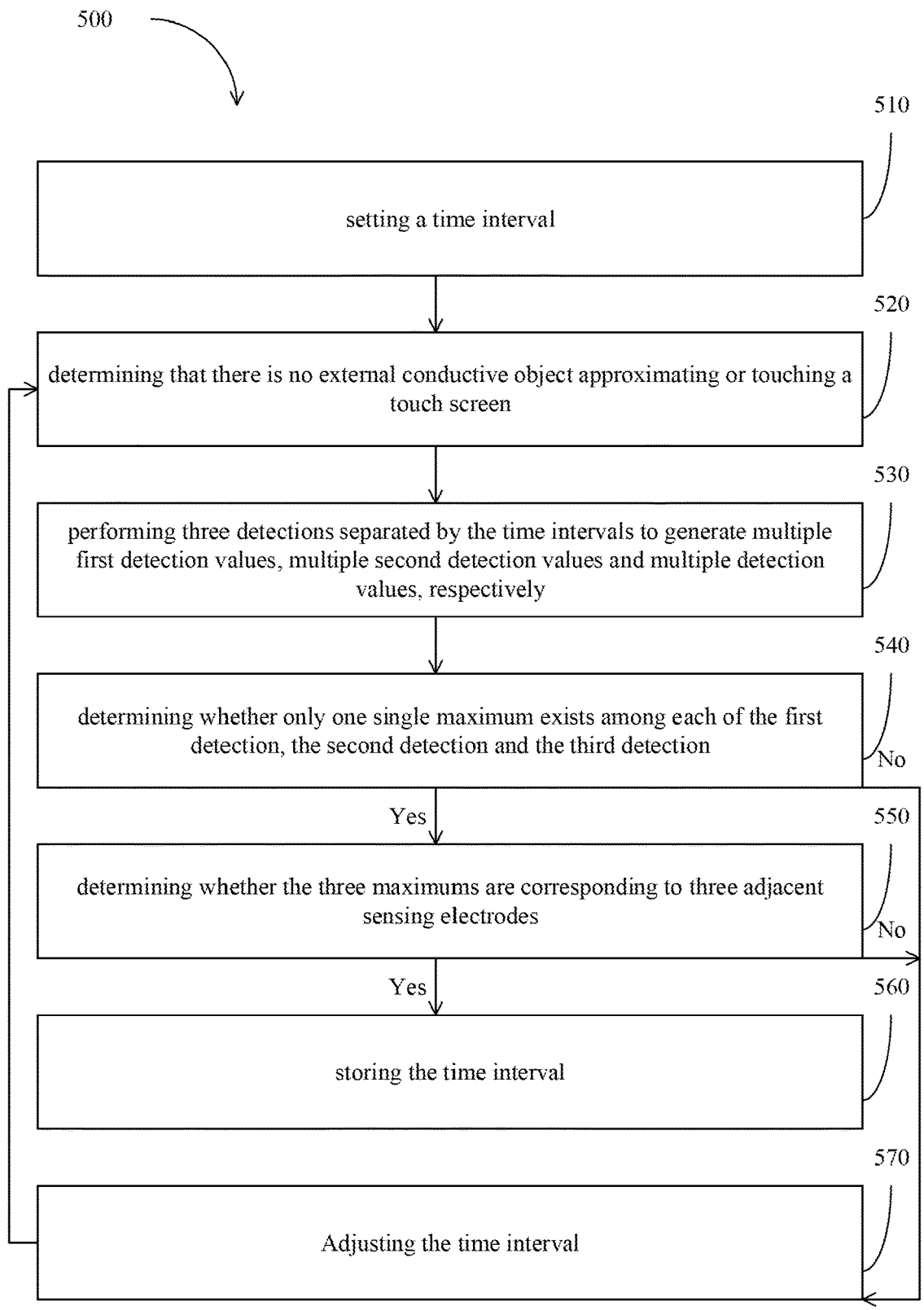
FIG. 5 shows a flowchart diagram of a touch sensitive method 500 in accordance with an embodiment of the present invention.

Please refer to FIG. 5, which shows a flowchart diagram of a touch sensitive method 500 in accordance with an embodiment of the present invention. The method could be supported by the embodiment of Table 2. The time interval that the method generates could be used in the embodiments of FIGS. 3A-D and FIGS. 4A-D. Step 510: setting a time interval. For example, an initial value is given to the time interval. Step 520: determining that there is no external conductive object approximating or touching a touch screen. Step 530: performing three detections separated by the time intervals to generate multiple first detection values, multiple second detection values and multiple detection values, respectively. The step 530 may be implemented as the steps 310-330. Step 540: determining whether only one single maximum exists among each of the first detection, the second detection and the third detection. If the determination result is positive, the flow goes to Step 550. Otherwise, the flow continues to Step 570. Step 550: determining whether the three maximums are corresponding to three adjacent sensing electrodes. In case the determination result is positive, the flow goes to Step 560. Step 560: storing the time interval. Step 570: adjusting the time interval. For example, the time interval may be increased if the three maximums are corresponding to one electrode or two adjacent sensing electrodes. In another example, the time interval may be decreased if the three maximums are corresponding to non-adjacent sensing electrodes.

In one embodiment, the present invention provides a touch sensitive apparatus for obtaining a time interval, which can be used in a touch sensitive method for reducing interference from pixel refreshing. The touch sensitive apparatus comprising: a sensing circuit and a processor connecting to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configured for determining whether only one single maximum exists among each of the first detection, the second detection and the third detection; determining whether the three maximums are corresponding to three adjacent sensing electrodes if only one single maximum exists among each of the first detection, the second detection and the third detection; and storing the time interval if the three maximums are corresponding to three adjacent sensing electrodes, wherein the multiple sensing electrodes are parallel to pixel horizontal axes of the touch screen.

In one embodiment, the present invention provides an electronic system for obtaining a time interval, which can be used in a touch sensitive method for reducing interference from pixel refreshing. The electronic system comprising: a touch screen; a sensing circuit; and a processor connected to the sensing circuit. The sensing circuit is configured for performing a first detection via multiple sensing electrodes of a touch screen to generate multiple first detection values; after a time interval, performing a second detection via the multiple sensing electrodes to generate multiple second detection values; and after the time interval, performing a third detection via the multiple sensing electrodes to generate multiple third detection values. The processor is configure for determining whether only one single maximum exists among each of the first detection, the second detection and the third detection; determining whether the three maximums are corresponding to three adjacent sensing electrodes if only one single maximum exists among each of the first detection, the second detection and the third detection; and storing the time interval if the three maximums are corresponding to three adjacent sensing electrodes, wherein the multiple sensing electrodes are parallel to pixel horizontal axes of the touch screen.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A touch sensitive method for reducing interference from pixel refreshing: comprising:

performing a first detection via multiple sensing electrodes of a touch screen to generate multiple first detection values;

after a time interval, performing a second detection via the multiple sensing electrodes to generate multiple second detection values;

after the time interval, performing a third detection via the multiple sensing electrodes to generate multiple third detection values;

adding the first detection values, the second detection values and the third detection values with respect to the multiple sensing electrodes up as multiple sums of detection values;

determining that an external conductive object is approximating or touching the touch screen nearby a N-th sensing electrode among the multiple sensing electrodes according to the multiple sums; and
determining a position of the external conductive object locates with respect to the multiple sensing electrodes according to one of the first detection values, the second detection values and the third detection values,
wherein the multiple sensing electrodes are parallel to pixel horizontal axes of the touch screen.

2. The touch sensitive method of claim 1, wherein the step for determining the position further comprises:
excluding or ignoring the first detection value corresponding to a N−1 th sensing electrode; and
determining the position of the external conductive object with respect to the multiple sensing electrodes according to the first detection values.

3. The touch sensitive method of claim 1, wherein the step for determining the position further comprises:
excluding or ignoring the third detection value corresponding to a N+1 th sensing electrode; and
determining the position of the external conductive object with respect to the multiple sensing electrodes according to the third detection values.

4. The touch sensitive method of claim 1, wherein the step for determining the position further comprises:
finding out a smallest one among the first detection value, the second detection value and the third detection value corresponding to the N-th sensing electrode;
specifying which one detection of the first detection, the second detection and the third detection the smallest one is corresponding to;
excluding or ignoring detection values of the specified detection corresponding to the N−1th and the N+1th sensing electrodes; and
determining the position of the external conductive object with respect to the multiple sensing electrodes according to the detection values of the specified detection.

5. The touch sensitive method of claim 4, wherein the step for determining the position further comprises:
excluding or ignoring detection values of the specified detection corresponding to the N−2th and the N+2th sensing electrodes.

6. A touch sensitive apparatus for reducing interference from pixel refreshing, comprising:
a sensing circuit, configured for:
performing a first detection via multiple sensing electrodes of a touch screen to generate multiple first detection values;
after a time interval, performing a second detection via the multiple sensing electrodes to generate multiple second detection values; and after the time interval; and
performing a third detection via the multiple sensing electrodes to generate multiple third detection values; and
a processor, connecting to the sensing circuit, configured for:
adding the first detection values, the second detection values and the third detection values with respect to the multiple sensing electrodes up as multiple sums of detection values;
determining that an external conductive object is approximating or touching the touch screen nearby a N-th sensing electrode among the multiple sensing electrodes according to the multiple sums; and
determining a position of the external conductive object locates with respect to the multiple sensing electrodes according to one of the first detection values, the second detection values and the third detection values,
wherein the multiple sensing electrodes are parallel to pixel horizontal axes of the touch screen.

7. The touch sensitive apparatus of claim 6, wherein the processor is further configured for:
excluding or ignoring the first detection value corresponding to a N−1 th sensing electrode; and
determining the position of the external conductive object with respect to the multiple sensing electrodes according to the first detection values.

8. The touch sensitive apparatus of claim 6, wherein the processor is further configured for:
excluding or ignoring the third detection value corresponding to a N+1 th sensing electrode; and
determining the position of the external conductive object with respect to the multiple sensing electrodes according to the third detection values.

9. The touch sensitive apparatus of claim 6, wherein the processor is further configured for:
finding out a smallest one among the first detection value, the second detection value and the third detection value corresponding to the N-th sensing electrode;
specifying which one detection of the first detection, the second detection and the third detection the smallest one is corresponding to;
excluding or ignoring detection values of the specified detection corresponding to the N−1th and the N+1th sensing electrodes; and
determining the position of the external conductive object with respect to the multiple sensing electrodes according to the detection values of the specified detection.

10. The touch sensitive apparatus of claim 9, wherein the processor is further configured for:
excluding or ignoring detection values of the specified detection corresponding to the N−2th and the N+2th sensing electrodes.

11. An electronic system for reducing interference from pixel refreshing, comprising:
a touch screen; and
a touch sensitive apparatus, connecting to the touch screen, comprises:
a sensing circuit, configured for:
performing a first detection via multiple sensing electrodes of the touch screen to generate multiple first detection values;
after a time interval, performing a second detection via the multiple sensing electrodes to generate multiple second detection values; and after the time interval; and
performing a third detection via the multiple sensing electrodes to generate multiple third detection values; and
a processor, connecting to the sensing circuit, configured for:
adding the first detection values, the second detection values and the third detection values with respect to the multiple sensing electrodes up as multiple sums of detection values;
determining that an external conductive object is approximating or touching the touch screen nearby a N-th sensing electrode among the multiple sensing electrodes according to the multiple sums; and
determining a position of the external conductive object locates with respect to the multiple sensing electrodes according to one of the first detection values, the second detection values and the third detection values, wherein the multiple sensing electrodes are parallel to pixel horizontal axes of the touch screen.

12. A touch sensitive method for reducing interference from pixel refreshing, comprising:
performing a first detection via multiple sensing electrodes of a touch screen to generate multiple first detection values;
after a time interval, performing a second detection via the multiple sensing electrodes to generate multiple second detection values;
after the time interval, performing a third detection via the multiple sensing electrodes to generate multiple third detection values;
adding the first detection values, the second detection values and the third detection values with respect to the multiple sensing electrodes up as multiple sums of detection values;
determining that an external conductive object is approximating or touching the touch screen nearby at least two adjacent sensing electrodes according to the sums of detection values; and
determining a position of the external conductive object locates with respect to the multiple sensing electrodes according to one of the first detection values, the second detection values and the third detection values,
wherein the multiple sensing electrodes are parallel to pixel horizontal axes of the touch screen.

13. The touch sensitive method of claim 12, wherein the step for determining the position further comprises:
specifying which one of the first detection, the second detection and the third detection is corresponding to a largest detection value, which is the largest among the first detection value, the second detection value and the third detection value with respect to a sensing electrode neighboring the at least two adjacent electrodes;
excluding or ignoring the detection value of the specified detection corresponding to the sensing electrode; and
determining the position according to the specified detection.

14. The touch sensitive method of claim 12, wherein the step for determining the position further comprises:
excluding or ignoring a specified detection corresponding to each one of the at least two sensing electrodes, wherein the specified detection corresponding to the sensing electrode has a detection value which is the most different than the other detection values;
excluding or ignoring a detection value corresponding to a sensing electrode neighboring to the at least two sensing electrodes of a non-excluded detection; and
determining the position of the external conductive object with respect to the multiple sensing electrodes according to the non-excluded detection.

15. The touch sensitive method of claim 12, wherein the step for determining the position further comprises:
calculating an average of two detection values corresponding to each one of the at least two sensing electrodes, wherein the two detection values are the closer two of the first detection values, the second detection values and the third detections; and
determining the position of the external conductive object with respect to the multiple sensing electrodes according to the at least two averages.

16. A touch sensitive apparatus for reducing interference from pixel refreshing, comprising:
a sensing circuit, configured for:
performing a first detection via multiple sensing electrodes of a touch screen to generate multiple first detection values;
after a time interval, performing a second detection via the multiple sensing electrodes to generate multiple second detection values; and
after the time interval, performing a third detection via the multiple sensing electrodes to generate multiple third detection values; and
a processor connected to the sensing circuit, configured for:
adding the first detection values, the second detection values and the third detection values with respect to the multiple sensing electrodes up as multiple sums of detection values;
determining that an external conductive object is approximating or touching the touch screen nearby at least two adjacent sensing electrodes according to the sums of detection values; and
determining a position of the external conductive object locates with respect to the multiple sensing electrodes according to one of the first detection values, the second detection values and the third detection values,
wherein the multiple sensing electrodes are parallel to pixel horizontal axes of the touch screen.

17. The touch sensitive apparatus of claim 16, wherein the processor is further configured for:
specifying which one of the first detection, the second detection and the third detection is corresponding to a largest detection value, which is the largest among the first detection value, the second detection value and the third detection value with respect to a sensing electrode neighboring the at least two adjacent electrodes;
excluding or ignoring the detection value of the specified detection corresponding to the sensing electrode; and
determining the position according to the specified detection.

18. The touch sensitive apparatus of claim 16, wherein the processor is further configured for:
excluding or ignoring a specified detection corresponding to each one of the at least two sensing electrodes, wherein the specified detection corresponding to the sensing electrode has a detection value which is the most different than the other detection values;
excluding or ignoring a detection value corresponding to a sensing electrode neighboring to the at least two sensing electrodes of a non-excluded detection; and
determining the position of the external conductive object with respect to the multiple sensing electrodes according to the non-excluded detection.

19. The touch sensitive apparatus of claim 16, wherein the processor is further configured for:
calculating an average of two detection values corresponding to each one of the at least two sensing electrodes, wherein the two detection values are the closer two of the first detection values, the second detection values and the third detections; and
determining the position of the external conductive object with respect to the multiple sensing electrodes according to the at least two averages.

20. An electronic system for reducing interference from pixel refreshing, comprising:
a touch screen; and
a touch sensitive apparatus connecting to the touch screen, comprises:

a sensing circuit, configured for:
  performing a first detection via multiple sensing electrodes of the touch screen to generate multiple first detection values;
  after a time interval, performing a second detection via the multiple sensing electrodes to generate multiple second detection values; and
  after the time interval, performing a third detection via the multiple sensing electrodes to generate multiple third detection values; and
a processor connected to the sensing circuit, configured for:
  adding the first detection values, the second detection values and the third detection values with respect to the multiple sensing electrodes up as multiple sums of detection values;
  determining that an external conductive object is approximating or touching the touch screen nearby at least two adjacent sensing electrodes according to the sums of detection values; and
  determining a position of the external conductive object locates with respect to the multiple sensing electrodes according to one of the first detection values, the second detection values and the third detection values,
wherein the multiple sensing electrodes are parallel to pixel horizontal axes of the touch screen.

21. A touch sensitive method for obtaining a time interval, which can be used in another touch sensitive method for reducing interference from pixel refreshing, comprising:
  setting a time interval;
  determining that there is no external conductive object approximating or touching a touch screen;
  performing a first detection via multiple sensing electrodes of the touch screen to generate multiple first detection values;
  after a time interval, performing a second detection via the multiple sensing electrodes to generate multiple second detection values;
  after the time interval, performing a third detection via the multiple sensing electrodes to generate multiple third detection values;
  determining whether only one single maximum exists among each of the first detection, the second detection and the third detection;
  determining whether the three maximums are corresponding to three adjacent sensing electrodes if only one single maximum exists among each of the first detection, the second detection and the third detection; and
  storing the time interval if the three maximums are corresponding to three adjacent sensing electrodes,
  wherein the multiple sensing electrodes are parallel to pixel horizontal axes of the touch screen.

22. A touch sensitive apparatus for obtaining a time interval, which can be used in a touch sensitive method for reducing interference from pixel refreshing, comprising:
  a sensing circuit, configured for:
    performing a first detection via multiple sensing electrodes of a touch screen to generate multiple first detection values;
    after a time interval, performing a second detection via the multiple sensing electrodes to generate multiple second detection values; and
    after the time interval, performing a third detection via the multiple sensing electrodes to generate multiple third detection values; and
  a processor connecting to the sensing circuit, configured for:
    determining whether only one single maximum exists among each of the first detection, the second detection and the third detection;
    determining whether the three maximums are corresponding to three adjacent sensing electrodes if only one single maximum exists among each of the first detection, the second detection and the third detection; and
    storing the time interval if the three maximums are corresponding to three adjacent sensing electrodes,
  wherein the multiple sensing electrodes are parallel to pixel horizontal axes of the touch screen.

23. An electronic system for obtaining a time interval, which can be used in a touch sensitive method for reducing interference from pixel refreshing, comprising:
  a touch screen;
  a sensing circuit, configured for:
    performing a first detection via multiple sensing electrodes of the touch screen to generate multiple first detection values;
    after a time interval, performing a second detection via the multiple sensing electrodes to generate multiple second detection values; and
    after the time interval, performing a third detection via the multiple sensing electrodes to generate multiple third detection values; and
  a processor connected to the sensing circuit, configured for:
    determining whether only one single maximum exists among each of the first detection, the second detection and the third detection;
    determining whether the three maximums are corresponding to three adjacent sensing electrodes if only one single maximum exists among each of the first detection, the second detection and the third detection; and
    storing the time interval if the three maximums are corresponding to three adjacent sensing electrodes,
  wherein the multiple sensing electrodes are parallel to pixel horizontal axes of the touch screen.

* * * * *